Patented Jan. 2, 1945

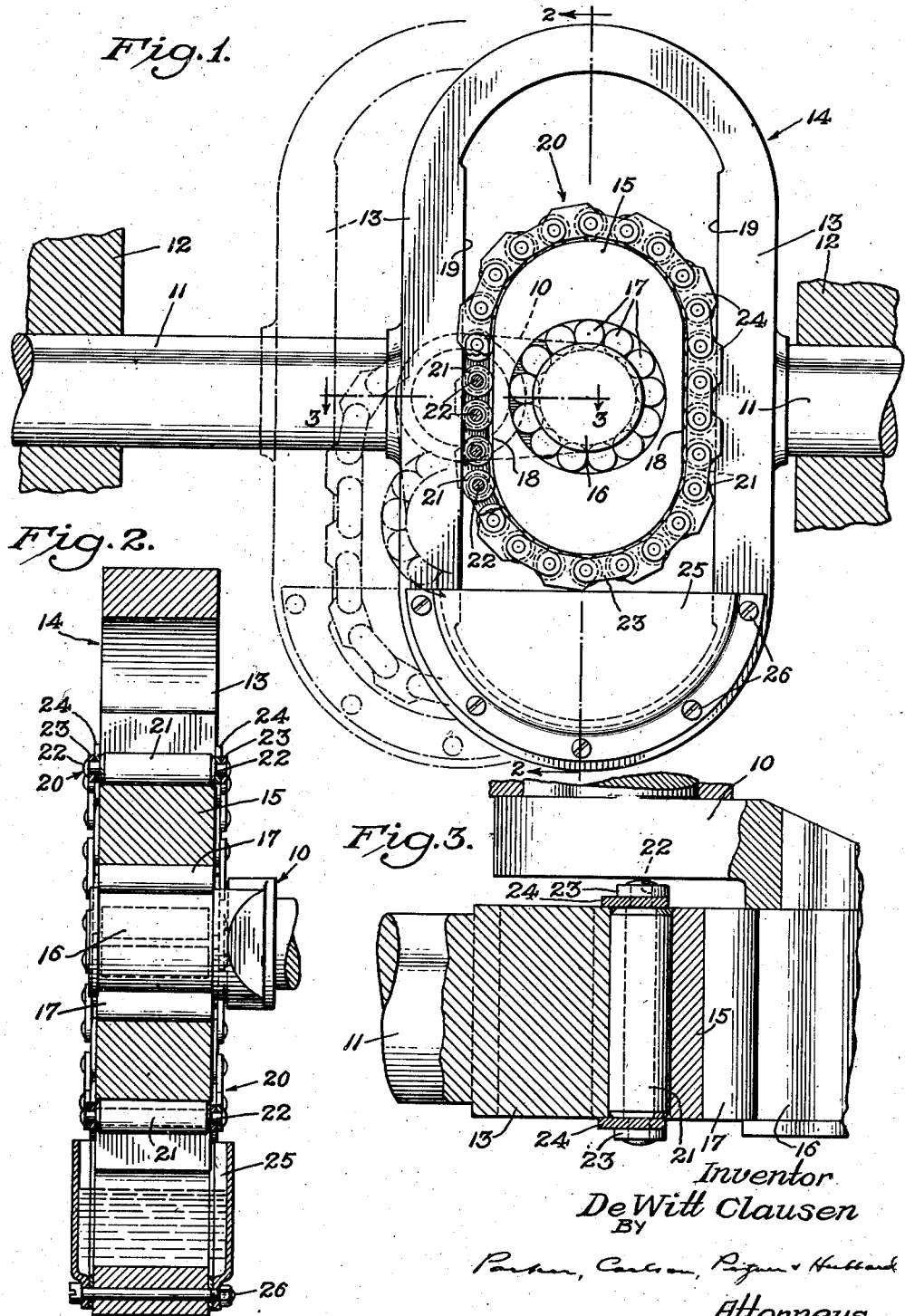

2,366,238

UNITED STATES PATENT OFFICE 2,366,238

SCOTCH YOKE

De Witt Clausen, Akron, Ohio, assignor to Lucien I. Yeomans, Inc., Chicago, Ill., a corporation of Illinois Application September 23, 1943, Serial No. 503,504

8 Claims. (Cl. 74—50)

The invention relates to Scotch yokes and has as its general aim the provision of a new and improved device of this character in which power loss due to friction is substantially eliminated and wear is minimized whereby the device has high efficiency and long life.

An object of the invention is to provide a Scotch yoke type of mechanical movement which embodies novel anti-friction means between the driving member or crank block and the driven member or crosshead, which means more particularly, is in the form on an endless anti-friction element carried by the block for engagement with the crosshead and free to travel or shift its position as a unit with respect to the block and crosshead during operation.

Another object is to provide novel means for lubricating the relatively movable parts of the device.

Other objects and advantages will become apparent in the following description and from the accompanying drawing, in which:

Figure 1 is a side view of a Scotch yoke device embodying the features of the invention.

Fig. 2 is a cross-sectional view through the device taken substantially along the line 2—2 of Fig. 1.

Fig. 3 is a sectional view on an enlarged scale taken substantially along the line 3—3 of Fig. 1.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The present invention is shown as being embodied in a Scotch yoke which constitutes the driving connection between a power driven crank 10 and the spaced pistons 11 of an opposed piston type pump. It will, of course, be understood that the instant device has utility in many other mechanisms. As shown, however, the pistons 11, which are reciprocably mounted in cylinder blocks 12, are at their inner or adjacent ends rigidly connected centrally with the elongated sides 13 of a slotted crosshead or yoke 14 that extend perpendicularly to the axes of the pistons. A block 15 is suitably supported on the pin 16 of the crank 10 by such means as roller bearings 17. The block is disposed in the slot of the crosshead and, as shown in Fig. 1, is generally elliptical in shape with flattened side faces 18 opposing flat internal surfaces 19 on the cross head sides 13.

In the operation of these devices the movement of the block through a circular path produces a straight line reciprocation of the crosshead in one direction and a reciprocatory movement of the block relative to the crosshead in a direction perpendicular to such straight line. The power loss due to friction between the relatively reciprocating parts and the comparatively heavy wear which introduces undesirable clearance or play between the block and crosshead are disadvantages which have been inherent in devices of this character. The present invention eliminates or substantially minimizes both of these factors in a simple and highly efficient way.

The width dimension of the block between the surfaces 18 is, as shown in Fig. 1, less than the distance between the surfaces 19 to provide a clearance between the opposed surfaces 18 and 19. The block 15 carries an endless and relatively movable antifriction member 20 which encircles the periphery of the block and on opposite sides thereof extends between the surfaces 18 and 19. In this instance the antifriction element is in the form of a chain comprised of cylindrical roller elements 21 having pintles 22 on its opposite ends thru which the elements are connected by links 23.

The length of each roller element is preferably substantially equal to the thickness of the block and the diameter of each element is approximately one-half the total difference between the width of the block and the distance between the crosshead surfaces 19. Each element will therefore span the clearance between the block and crosshead to transmit the thrust forces from the block to the crosshead. The spacing of the elements lengthwise of the chain is such that a plurality of the elements will always be interposed between and in contact with the surfaces 18 and 19 on the block and crosshead, respectively. As herein shown, each pair of such surfaces is always engaged by four, and sometimes by five, elements.

These relationships provide, as a thrust transmitting agency between the block and crosshead, a plurality of close fitting antifriction elements located on the line of thrust. It will moreover be noted that although the antifriction member encircles and is mounted on the block it is as a whole relatively movable both to the block and to the crosshead. As a result, the forces applied to the roller elements first on one side of the block and crosshead and then on the other will cause the antifriction member to travel or creep in a direction of its length whereby wear of the roller elements will be spread evenly over a large number of elements.

Transverse displacement of the chain relative to the block and crosshead may be suitably prevented as by providing small projections or lips 24 on certain of the links to overlap the sides of either the block or the crosshead. As shown, the projections are formed on alternate links to overlap the sides of the crosshead. The surfaces 19 on the crosshead may be formed integrally therewith, as shown, or they may be the finished surfaces of suitable wear plates secured to the crosshead.

Novel means is provided for lubricating the relatively movable elements and surfaces of the block and crosshead assembly in a simple, effective manner. Thus, the cross head is employed to form a part of a lubricant reservoir which is completed by a closure member or the like secured to and carried by the crosshead. Where, as shown in Fig. 1, the device is employed in mechanism in which the driven member and the crank operate on horizontal axes, the lubricant reservoir is formed by a pair of plates 25, secured as by screws 26, one on each side of the lower end of the crosshead. The block in its vertical reciprocation on the crosshead will dip into a supply of lubricant in the reservoir and the creeping travel of the antifriction member will carry the lubricant to all bearing surfaces.

It will be evident from the foregoing that a new and improved Scotch yoke has been provided which, through substantial reduction in power loss, minimization of wear and improved lubrication, is highly efficient and has a materially increased operative life.

I claim as my invention:

1. In a Scotch yoke the combination of a slotted crosshead having opposed internal surfaces, a block disposed in the slot, means for moving said block through a circular path, and endless flexible antifriction means encircling said block and including an endless series of articulated members carrying antifriction elements interposed in bearing relation between said block and said internal surfaces on said crosshead.

2. In a Scotch yoke the combination, with a slotted crosshead and a member in the slot movable through a circular path, of an endless flexible antifriction means including an endless series of articulated members carrying antifriction elements interposed between said crosshead and said member in rolling contact with the opposed surfaces thereof, said antifriction means being shiftable bodily relative to said crosshead and member in a direction circumferential of the latter.

3. In a device of the character described, the combination of a part to be driven, driving means having reciprocatory movement relative to said part and in such movement adapted to impart thrust forces alternately to opposed surfaces on the driven part, and a continuous antifriction means interposed between said driving means and said opposed surfaces, said antifriction means being shiftable with respect to said driven part and said driving means by the relative reciprocatory movement aforesaid and including an endless series of articulated members carrying antifriction elements disposed in rolling contact with said driving means and said opposed surfaces.

4. In a Scotch yoke the combination of a slotted crosshead mounted for reciprocatory movement, a block movable through a circular path, said block being dimensioned to have clearance on its opposite sides from the sides of the crosshead generally perpendicular to the line of reciprocation thereof, an endless chain encircling said block and extending through said clearances, said chain including transverse roller elements dimensioned to span said clearances, the spacing between said roller elements being such as to insure the engagement of a plurality of elements with said block and said crosshead, said chain being free for longitudinal travel relative to said block and crosshead, and means for maintaining said chain against displacement transversely of said block.

5. In a Scotch yoke the combination of a slotted crosshead mounted for reciprocatory movement, a block movable through a circular path, said block being dimensioned to have clearance on its opposite sides from the sides of the crosshead generally perpendicular to the line of reciprocation thereof, and an endless chain encircling said block and extending through said clearances and shiftable relative thereto, said chain being arranged to provide engagement of a plurality of elements with said block and said crosshead.

6. In a Scotch yoke the combination of a slotted crosshead mounted for reciprocatory movement, a block movable through a circular path, said block being dimensioned to have clearance on its opposite sides from the sides of the crosshead generally perpendicular to the line of reciprocation thereof, and an endless chain encircling said block and extending through said clearances, said chain including transverse roller elements dimensioned to span said clearances, said chain being free for longitudinal travel relative to said block and crosshead, and means for preventing transverse movement of said chain.

7. In a Scotch yoke the combination of a slotted crosshead mounted for reciprocatory movement, a block movable through a circular path, said block being dimensioned to have clearance on its opposite sides from the sides of the crosshead generally perpendicular to the line of reciprocation thereof, an endless chain encircling said block and extending through said clearances, said chain including transverse roller elements dimensioned to span said clearances, said chain being free for longitudinal travel relative to said block and crosshead, and a lubricant reservoir at one end of said crosshead in the path of circular movement of said block.

8. In a Scotch yoke the combination, with a slotted crosshead and a member in the slot movable through a circular path, of an endless flexible antifriction means interposed between said crosshead and said member in antifriction relation to opposed surfaces thereof, said antifriction means being shiftable bodily relative to said crosshead and member, and a reservoir for lubricant on said crosshead through which at least parts of said member and antifriction means pass in their movements.

DE WITT CLAUSEN.